(12) United States Patent
Kaneko

(10) Patent No.: US 6,291,969 B1
(45) Date of Patent: Sep. 18, 2001

(54) CHARGING PADDLE WHICH PREVENTS DAMAGE OF THE SURFACE OF THE PRIMARY CORE AND METHOD OF MANUFACTURING THE SAME

(75) Inventor: Masaaki Kaneko, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/679,589

(22) Filed: Oct. 4, 2000

(30) Foreign Application Priority Data

Oct. 12, 1999 (JP) .................................... 11-289824

(51) Int. Cl.⁷ ........................... H01M 10/44; H01M 10/46
(52) U.S. Cl. ................................................. 320/108
(58) Field of Search ..................... 320/107, 108, 320/109; 336/DIG. 2

(56) References Cited

U.S. PATENT DOCUMENTS 5,216,402  6/1993  Carosa ..................................... 336/66

5,917,307 *  6/1999  Watanabe et al. .................... 320/108

* cited by examiner

*Primary Examiner*—Edward H. Tso
(74) *Attorney, Agent, or Firm*—Morgan & Finnegan, LLP

(57) ABSTRACT

An electromagnetic induction type connection terminal for charging a battery includes a charging paddle and a charging receptacle for receiving the charging paddle. The charging paddle has a primary coil that is connected to a power supply station. The charging receptacle has a secondary coil that is connected to the battery. A current sent from the power supply station is supplied to the primary coil, which causes a current to flow the secondary coil. The charging paddle includes a paddle case having a surface, which has an opening, a protrusion extending from the paddle case, and a core about which the primary coil is wound. The core is held within the paddle case, and surfaces of the core are exposed through the opening. The protrusion is positioned near the exposed surfaces of the core for preventing the exposed surfaces of the core from being damaged when the charging paddle is plugged into the charging receptacle.

14 Claims, 6 Drawing Sheets

CHARGING PADDLE WHICH PREVENTS DAMAGE OF THE SURFACE OF THE PRIMARY CORE AND METHOD OF MANUFACTURING THE SAME

BACKGROUND OF THE INVENTION

The present invention relates to a charging paddle for use in an induction type charging apparatus for charging a battery of an electric vehicle or the like.

Conventionally, conduction type charging apparatuses and an induction type charging apparatuses have been used for charging batteries of electric vehicles. The conduction type charging apparatus has a contact type connection terminal for directly connecting an external power supply to a battery-equipped vehicle. The induction type charging apparatus has a non-contact type connection terminal for connecting a power supply with a battery through electromagnetic induction. The induction type charging apparatus is less susceptible to contact failure. In addition, induction type charging apparatuses are smaller than conduction type charging apparatuses, so the induction type charging apparatuses have drawn particular attention in recent years.

FIG. 6 illustrates a connection terminal of a conventional induction type charging apparatus. The connection terminal has a charging paddle 61 and a charging receptacle 71, which receives the charging paddle 61. The charging paddle 61 is connected to a cable 67 that extends from an external power supply station (not shown). The charging receptacle 71 is installed in an electric vehicle and is connected to a battery in the vehicle.

The charging receptacle 71 has a port 72 for receiving the charging paddle 61, a secondary core 76 contained within the charging receptacle 71, and a secondary coil 74 wound around the secondary core 76. The secondary core 76 functions as a power receiving core, while the secondary coil 74 functions as a power receiving coil. The charging paddle 61 has a paddle case 62 formed of a synthetic resin and an insertable end 63.

The insertable end 63 contains a primary core 64 and a primary coil 65 wound around the primary core 64. The primary core 64 functions as a power transmitting core, while the primary coil 65 functions as a power transmitting coil 65. For supplying power, the charging paddle 61 is plugged into the port 72 of the charging receptacle 71 to place the primary coil 65 on the secondary coil 74. Then, the power supply station passes a current (alternating current) through the primary coil 65 to induce power in the secondary coil 74.

FIG. 7 is a perspective view illustrating the primary core 64 and the secondary core 76 when the charging paddle 61 is plugged into the port 72 of the charging receptacle 71 for charging. The primary core 64 is substantially cylindrical. The secondary core 76 includes first and second core elements 73, 75. The first core element 73 has an E-shaped cross-section, and is provided with a central magnetic cylindrical protrusion 73a about which the secondary coil 74 is wound. The secondary coil 74 is accommodated in a groove formed around the protrusion 73a. The second core element 75 is plate-like and covers the groove. The core elements 73, 75 are combined such that the secondary core 76 forms a rectangular loop that surrounds a passage occupied by the insertable end 63 of the charging paddle 61. When the charging paddle 61 is fully plugged into the port 72 of the charging receptacle 71, the primary core 64 is sandwiched between the protrusion 73a of the second core 76 and the plate-like core 75 (FIG. 8). In this way, a closed magnetic circuit is formed, where the primary coil 65 is coupled with the secondary coil 74.

In the closed magnetic circuit, the power transmission efficiency between the primary coil 65 and the secondary coil 74 must be maximized. For this reason, a gap between the primary core 64 and the protrusion 73a of the secondary core 76, and a gap between the primary core 64 and the plate-like core 75 are minimized in order to minimize flux leaking from the closed magnetic circuit.

Since the gaps are minimized, it is difficult for the operator to plug the charging paddle 61 into the port 72 of the charging receptacle 71 without causing the insertable end 63 of the charging paddle 61 to interfere with the secondary core 76. Actually, the insertable end 63 interferes with a region of the secondary core 76 along which the insertable end 63 passes. In the following, this action will be described in detail.

In FIG. 7, the top surface of the distal end 66 of the paddle case 62 enters far into the charging receptacle 71 as it contacts a lower surface 77 of the core 75. Simultaneously, the bottom surface of the distal end 66 contacts an upper surface 78 of the protrusion 73a of the core 73. As the charging paddle 61 is further pressed into the charging receptacle 71, the charging paddle 61 abuts against a stopper (not shown) within the charging receptacle 71 at a position at which the primary core 64 overlaps with the protrusion 73a of the core 73. At this time, the insertion of the charging paddle 61 is complete. The insertable end 63 of the charging paddle 61 has a front, surface and a back surface that are the same, so that the insertable end 63 may be plugged into the charging receptacle 71 in either of two orientations.

FIG. 8 is a cross-sectional view illustrating the charging paddle 61 when it has been fully plugged into the charging receptacle 71. The top surface and the bottom surface of the primary core 64 are positioned within the paddle case 62 at a fixed distance from the top surface and the bottom surface of the paddle case 62, respectively. Therefore, while the charging paddle 61 is being plugged in, the top surface and the bottom surface of the primary core 64 do not interfere with the secondary core 76. When the charging paddle 61 is fully plugged in, the protrusion 73a of the core 73 of the charging receptacle 71 fits into a recess 69 in the primary core 64 of the paddle case 62.

The primary core 65 generates heat due to the charging current, and accordingly, the primary core 64 is heated. The primary coil 65 is coated with a resin coating 68, which mitigates the heat.

Since the paddle case 62 of the charging paddle 61 is thin and formed of a synthetic resin, its surface is susceptible to distortion or unevenness. This makes it difficult to maintain the thickness of the paddle case 62 at a defined dimension. Therefore, as illustrated in FIG. 9, the top surface and the bottom surface of the primary core 64 often protrude outward beyond the surface of the paddle case 62.

When the deformed charging paddle 61 is plugged into the charging receptacle 71, the primary core 64 interferes directly with the lower end 77 of the core 75 and the upper end 78 of the protrusion 73a. This peels off the coating 68 applied to the surface of the primary core 64.

SUMMARY OF THE INVENTION

It is an object of the present invention to provide a charging paddle that is capable of preventing the surface of the primary core from being damaged.

To achieve the above objective, the present invention provides a charging paddle for an electromagnetic induction type connection terminal for connecting a power supply station to a battery for charging the battery. The connection terminal includes a charging paddle and a charging receptacle. The charging paddle includes a primary coil that is connected to the power supply station. The charging receptacle includes a secondary coil that is connected to the battery. The charging receptacle receives the charging paddle. A current supplied from the power supply station to the primary coil causes a current to flow between the secondary coil and the battery. The charging paddle includes a paddle case, a core, and a protrusion. The paddle case has a surface which includes an opening. The primary coil is wound about the core. The core is held within the paddle case such that a surface of the core faces outside through the opening. The protrusion extends outwardly from the surface of the core.

The present invention also provides a method of manufacturing a charging paddle. The charging paddle includes a paddle case, a core, and a protrusion. The paddle case includes a pair of shells. Each shell includes a surface having an opening. Each shell has a peripheral edge portion that extends inward. Each edge portion has an end face. The primary coil is wound about the core. The core has surfaces that face the outside through the opening. The protrusion extends from the surface of each shell. The protrusion has an end face. The method includes putting the pair of shells one upon the other such that the end faces of the edge portions of the shells contact each other. The shells are vibration welded together to form the paddle case. The core is held by the shells such that surfaces of the core face the outside through the opening. Each protrusion extends outward beyond the corresponding outwardly facing surface of the core.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
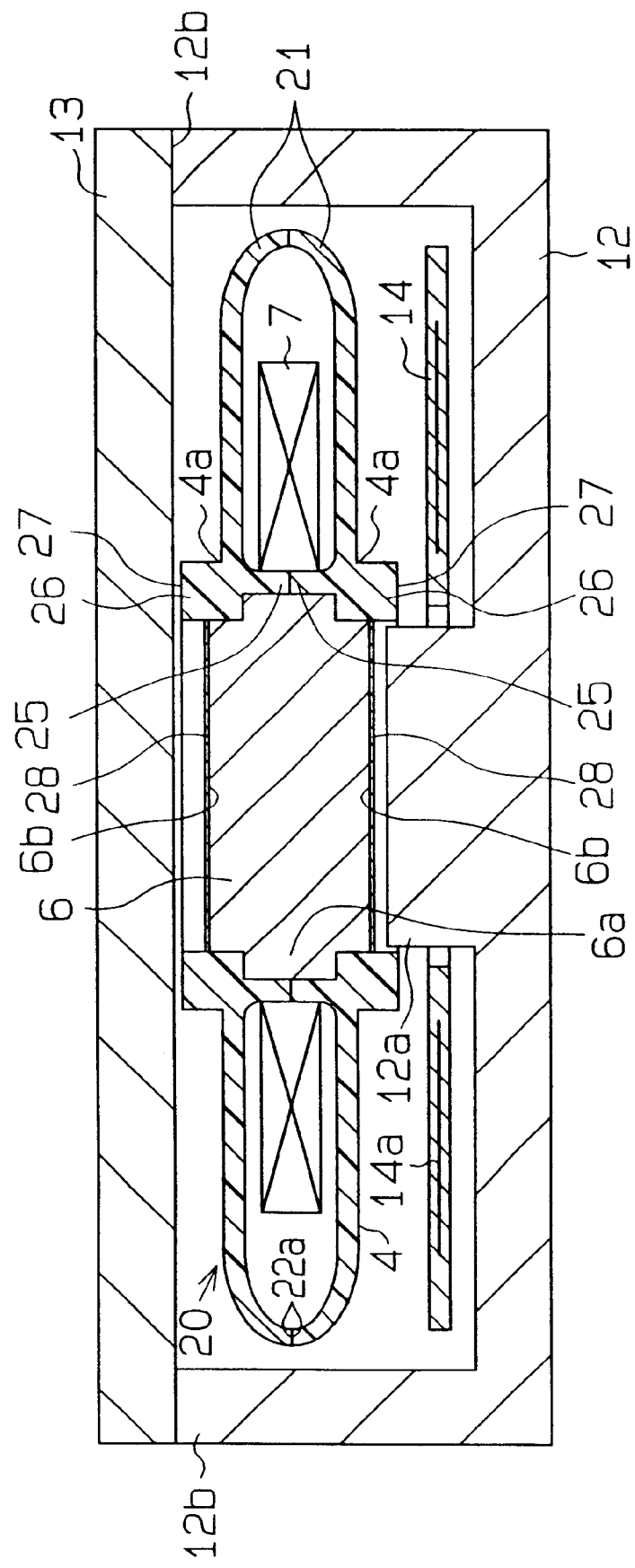
FIG. 1 is a cross-sectional view illustrating a charging paddle plugged into a charging receptacle, for illustrating one embodiment of the present invention.

An induction type charging apparatus according to one embodiment of the present invention will hereinafter be described with reference to FIGS. 1 to 4. As illustrated in FIG. 4, the induction type charging apparatus 1 has a connection terminal that includes a charging paddle 2 and a charging receptacle 3 for receiving the charging paddle 2. A cable 9 extends from a power supply station 8 installed. The charging paddle 2 is attached to the distal end of the cable 9. The charging receptacle 3 is arranged at a predetermined position within an electric vehicle 10 (for example, in front of a hood in FIG. 4) and connected to a battery 15 in the electric vehicle 10.

The charging paddle 2 has an insertable end 4 and a grip 5. The charging receptacle 3 has a port 11 for accommodating the insertable end 4. The insertable end 4 can be inserted into and removed from the port 11 of the charging receptacle 3. The front surface and the back surface of the insertable end 4 have the same shape.

For charging the electric vehicle 10, the insertable end 4 of the charging paddle 2 is plugged port 11 of the charging receptacle 3, as indicated by the broken lines in FIG. 4. At this time, an alternating current of a predetermined value is sent from the power supply station 8 to the charging paddle 2 through the cable 9. The alternating current is received by the charging receptacle 3 through electromagnetic induction to charge the battery 15.

Figure 3:
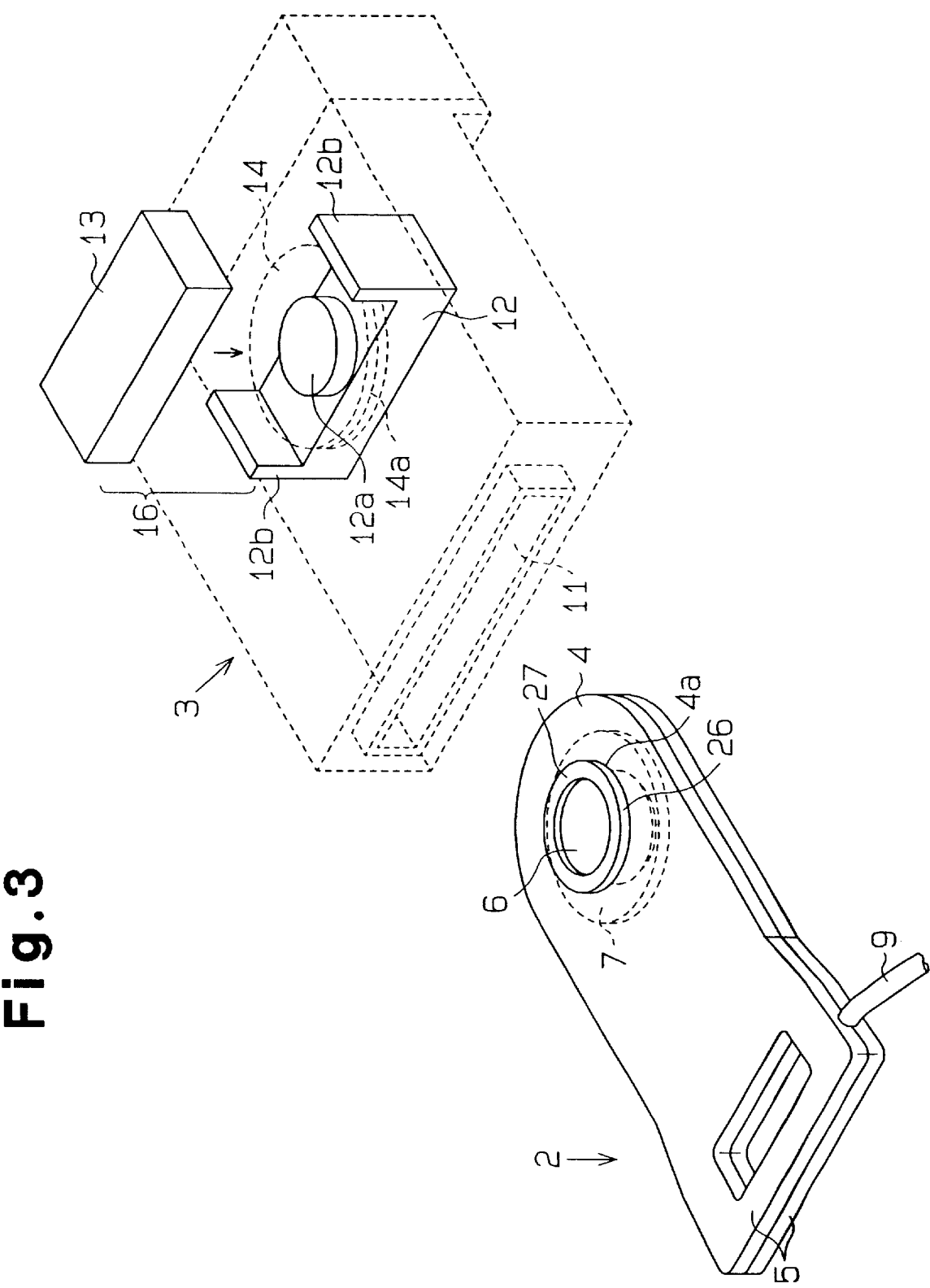
FIG. 3 is a perspective view illustrating the charging paddle and the charging receptacle in FIG. 1.
Figure 4:
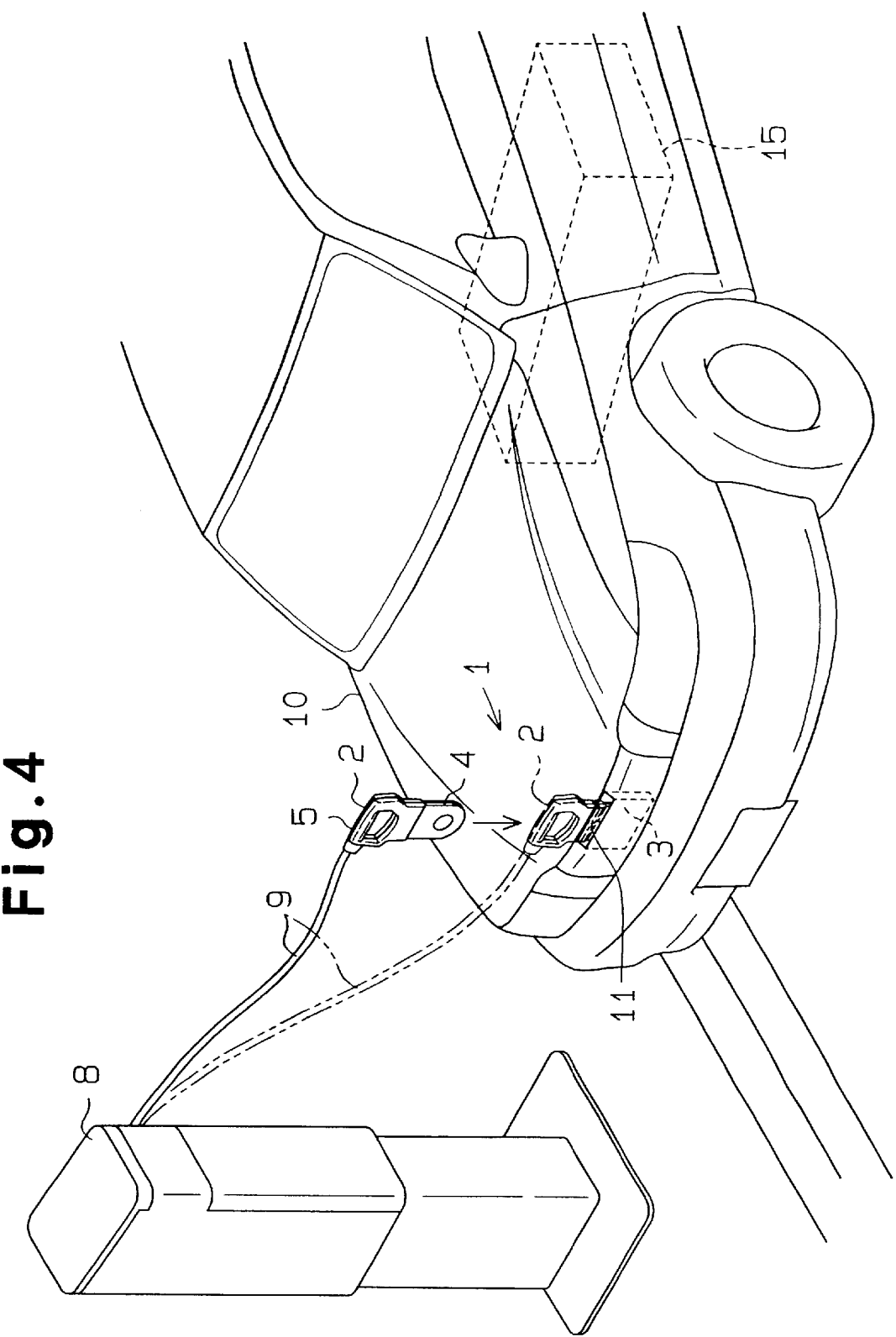
FIG. 4 is a perspective view showing typical usage of an induction type charging apparatus.

As illustrated in FIG. 3, the charging paddle 2 has an insertable end 4, which includes a primary core 6 made of ferrite, and a primary coil 7 wound around the primary core 6. The primary core 6 functions as a power transmitting core, while the primary coil 7 functions as a power transmitting coil. The power supply station 8 is adapted to carry current to the primary coil 7 of the charging paddle 2 through the cable 9.

The charging receptacle 3 contains a secondary core 16 that includes an E-shaped core member 12 made of a ferrite core and a flat core member 13. The secondary core 16 functions as a power receiving core. A magnetic central protrusion 12a in the E-shaped core member 12 is cylindrical. A coil substrate 14 is located around the central protrusion 12a. A plurality of secondary coils 14a are laminated on the coil substrate 14. The secondary coils 14a function as a power receiving coil. The central protrusion 12a protrudes less than the side protrusions 12b. This is so the insertable end 4 of the charging paddle 2 can pass between the central protrusion 12a and the flat core 13 when the charging paddle 2 is plugged into the chargingreceptacle3. Whenthechargingpaddle2isfullyplugged into the charging receptacle 3, the central protrusion 12a opposes the primary core 6 of the charging paddle 2.

Therefore, when a current is sent from the power supply station 8 to the primary coil 7 of the charging paddle 2 when the charging paddle 2 fully plugged into the charging receptacle 3, an inductive electromotive force for charging is generated in the secondary coil 14a of the charging receptacle 3. The battery 15 in the electric vehicle 10 is charged based on this inductive electromotive force.

Figure 2:
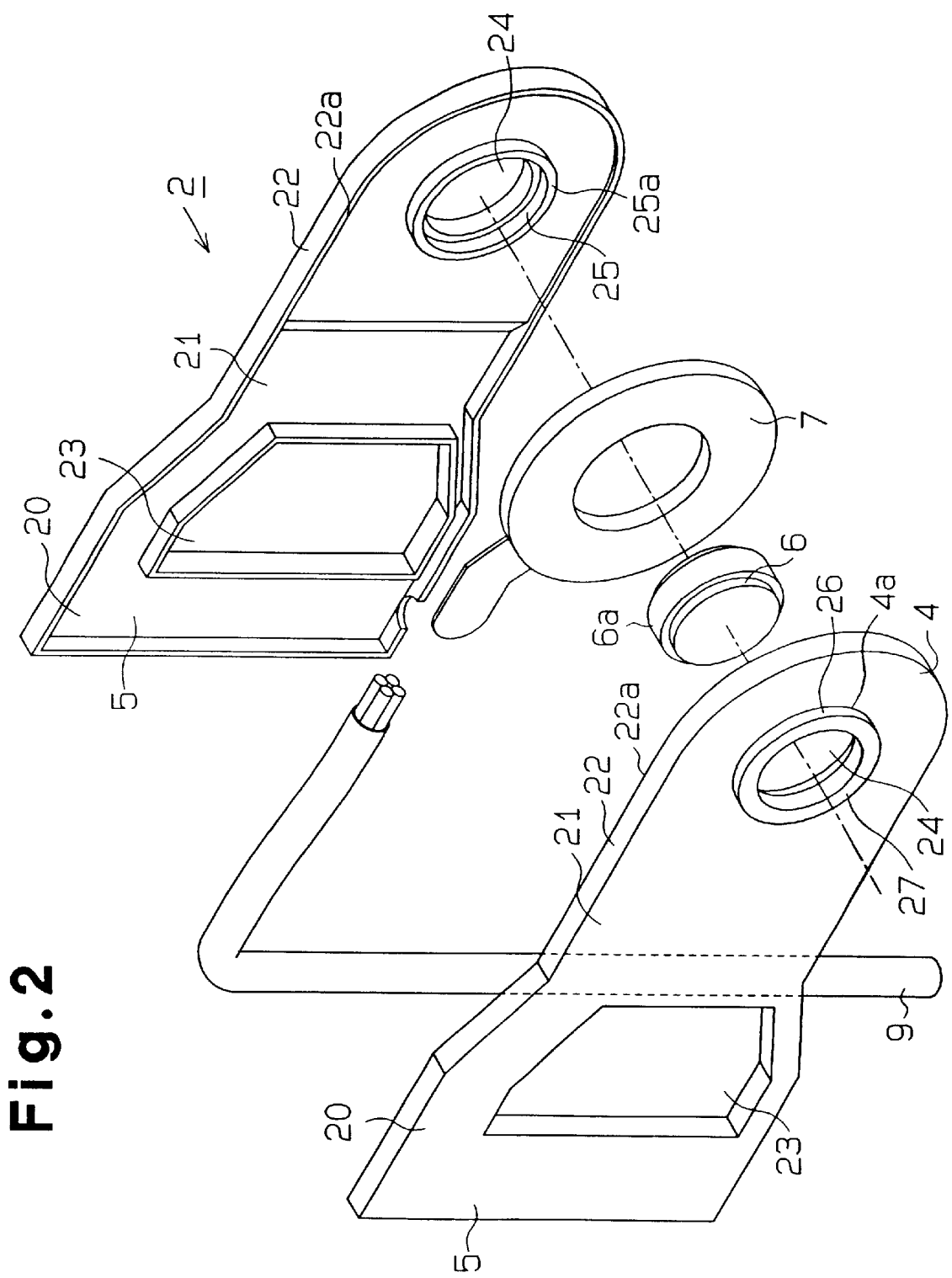
FIG. 2 is an exploded perspective view illustrating the charging paddle in FIG. 1.

The structure of the charging paddle 2 will be explained in detail with reference to FIGS. 1 and 2. FIG. 1 is a cross-sectional view illustrating the charging paddle 2 when it is plugged into the charging receptacle, for illustrating one embodiment of the present invention. FIG. 2 is an exploded cross-sectional view illustrating the charging paddle 2 in FIG.

In FIG. 2, the charging paddle 2 includes a primary core 6, a primary coil 7, and a paddle case 20. The primary core 6 is formed in the shape of thick disk. A peripheral projection 6a is formed at the center of an outer surface of the primary core 6. The primary coil 7 is annular and is connected to the cable 9.

The paddle case 20 has a pair of shells 21 arranged in opposition to each other. The shells 21 are formed of an electrically insulating synthetic resin. Each of the shells 21 has an outer peripheral edge 22, which protrudes toward the opposing shell 21. The two shells 21 are welded to each other at the distal end faces 22a of the respective outer peripheral edges 22 to form the paddle case 20. Each of the shells 21 has a hand opening 23 for forming a grip 5 on its proximal end. Each of the shells 21 also has a core opening 24 for exposing the primary core 6 on the distal end side. The core opening 24 functions to fix the core. An inner annular protrusion 25 extends toward the opposing shell 21 from the inner peripheral edge of the core opening 24. When the pair of shells 21 are welded to each other, the distal end faces 25a of the inner annular protrusions 25 are also welded to each other.

The inner diameter of the inner annular protrusion 25 is identical to the outer diameter of the peripheral projection 6a of the primary core 6 (see FIG. 1). The axial length of the two inner annular protrusions 25, when the pair of inner annular protrusions 25 are welded, matches the axial dimension of the peripheral projection 6a. In other words, the peripheral projection 6a is fitted into the pair of welded inner annular protrusions 25. Also, the outer diameter of the inner annular protrusion 25 matches the inner diameter of the inner surface of the primary coil 7. In other words, the primary coil 7 is fitted on the outer peripheral surface of the welded inner annular protrusions 25.

On the outer periphery of each core opening 24 is an outer annular protrusion 26. The outer annular protrusion 26 prevents the primary core 6 from interfering with the secondary core 16 (cores 12, 13) of the charging receptacle 3. Therefore, the outer annular protrusion 26 extends from the outer surface 4a of the insertable end 4 of each shell 21. The outer surface 4a functions as an inserting surface of the charging paddle 2. As illustrated in FIG. 1, the end face 27 of each outer annular protrusion 26 is flat and functions as a control face for manufacturing.

The inner diameter of each outer annular protrusion 26 is smaller than the inner diameter of the inner annular protrusion 25 and is the same as the outer diameter of the primary core 6. Therefore, the outer peripheral surface of the primary core 6, except for the annular projection 6a, is held by the inner peripheral surfaces of the outer annular protrusion 26.

The distance between the end face 27 and the outer surface 4a is set so that the exposed surface 6b of the primary core 6 does not extend beyond the end face 27 when the primary core 6 is fixed by the annular protrusions 25, 26. In greater detail, the distance between the end face 27 and the outer surface 4a is set so that a coating layer 28 formed on the exposed surface 6b of the primary core 6 does not extend beyond the end face 27. The coating layer 28 is formed of a resin. The coating layer 28 maybe a Teflon coating layer. In the present invention, the distance from the exposed surface 6b of the primary core 6 to the end face 27 is 0.1 mm, and the thickness of the coating layer 28 is 20 μm.

Next, an assembling method for assembling the primary core 6 and the primary coil 7 in the paddle case 20 will be explained with reference to FIGS. 1 and 2.

First, one of the shells 21 is placed on a fixing table of a vibration welder while its outer annular protrusion 26 faces downward. The shell 21 is thus oriented such that the end face 22a of the outer periphery 22 of the shell 21 is horizontal. In other words, the shell 21 is supported by the fixing table such that the outer surface 4a and the end face 27 of the outer annular protrusion 26 are horizontal.

In this state, the primary core 6 is fitted into the inner annular protrusion 25 of the shell 21, and the primary coil 7 is fitted on the inner annular protrusion 25. Thus, lower halves of the primary core 6 and the primary coil 7 in the thickness direction are fitted into and on the inner annular protrusion 25.

Next, the other shell 21 is set on the fixed shell 21 from above. Specifically, the end faces 22a of the outer peripheries 22 of the two shells 21 are put one upon the other, and the end faces 25a of the inner annular protrusions 25 are put one upon the other. Consequently, the entire primary core 6 is held inside the pair of coupled inner annular protrusions 25, and the entire primary coil 7 is fully fitted on the pair of the inner annular protrusions 25.

Subsequently, a vibration plate of the vibration welder is moved downward toward the fixing table from above. When the lower surface of the vibration plate abuts against the upper shell 21, the outer surface 4a of the upper shell 21 and the end face 27 of the outer annular protrusion 26 are horizontal. In this state, the vibration plate is vibrated to start the vibration welding.

The vibration welder vibrates the vibration plate while moving the same downward. This vibration welds the end faces 22a of the outer pheripheries 22 of the upper and lower shells 21 to each other and the end faces 25a of the inner annular protrusions 25 to each other. In this event, the vibration welder detects the amount of movement in the downward direction of the vibration table with respect to the fixed table. Also, the vibration welder calculates the spacing between the end faces 27 of the outer annular protrusions 26, which are sandwiched between the fixed table and the vibration plate, each time the amount of movement is detected.

When the spacing between the end faces 27 of the outer annular protrusions 26 becomes equal to a predetermined spacing, the vibration welder stops lowering the vibration plate and stops the vibration. As a result, the end faces 22a of the outer peripheries 22 are welded together and the end faces 25a of the inner annular protrusions 25 are welded together to form the paddle case 20, which includes the primary core 6 and the primary coil 7 accommodated in the insertable end 4. In this embodiment, the predetermined spacing is set at a value that is larger than the spacing between the upper and lower exposed surfaces 6b of the primary core 6, which ensures a requisite distance (0.1 mm) from the respective upper and lower exposed surfaces 6b to the corresponding end faces. Therefore, the paddle case 20 can be coupled to the charging receptacle 3, and the exposed surfaces 6b of the primary core 6 are prevented from extending outward beyond the end faces 27 of the outer annular protrusions 26.

The charging paddle 2 constructed as described above has the following features.

The primary core 6, which is positionedwithin the insertable end 4 is surrounded by the outer annular protrusions 26, which are formedonthe outer surfaces 4a of the shells 21. This prevents the exposed surfaces 6b (coating layers 28) of the primary core 6 from directly contacting the central protrusion 12a of the E-shaped core member 12 and the flat core member 13 when the charging paddle 2 is plugged into the charging receptacle 3.

Further, since the outer annular protrusions 26 extend from the outer surfaces 4a to surround the primary core 6, the exposed surfaces 6b (coating layers 28) of the primary core 6 will not extend outward beyond the end faces 27 of the outer annular protrusions 26, even if the paddle case 20 is thermally deformed.

The coating layer 28 is preferably a Teflon coating layer. Since Teflon is rigid and resistant to heat, the coating layer 28 is unlikely to be damaged.

A pair of the shells 21, which are made of a synthetic resin, are welded by vibration welding to form the paddle case 20. The vibration welding-based bonding can form a uniform joint without unevenness, as compared with adhesive-based bonding or ultrasonic-based bonding. Moreover, a highly accurate paddle case can be readily formed in a short period of time.

The distance between the end faces 27 of the upper and lower shells 21 is set by adjusting a force with which the two shells 21 are joined together and the vibrating frequency when the shells 21 are vibration welded into the paddle case 20. The vibration welding facilitates the adjustment of the distance. It is therefore possible to fix the distance between the end faces 27 with a set dimension and to reliably fit the primary core 6 into the paddle case 20.

The vibration welding is stopped when the spacing between the end faces 27 of the outer annular protrusions 26 of the two shells 21 becomes equal to a predetermined spacing. In this way, it is possible to accurately determine the relative positions of the exposed surfaces 6b of the primary core 6 and the end faces 27 of the outer annular protrusions 26.

It should be apparent to those skilled in the art that the present invention may be embodied in many other specific forms without departing from the spirit or scope of the invention. Particularly, it should be understood that the invention may be embodied in the following forms.

Figure 5:
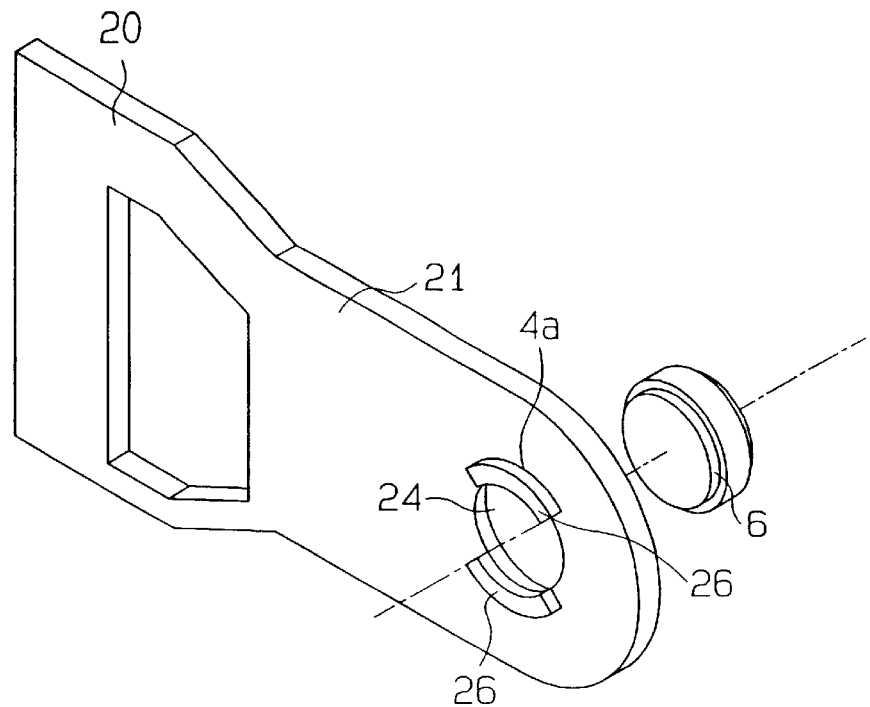
FIG. 5 is an exploded perspective view illustrating another embodiment of protrusions that are located on opposite sides of the opening.
Figure 6:
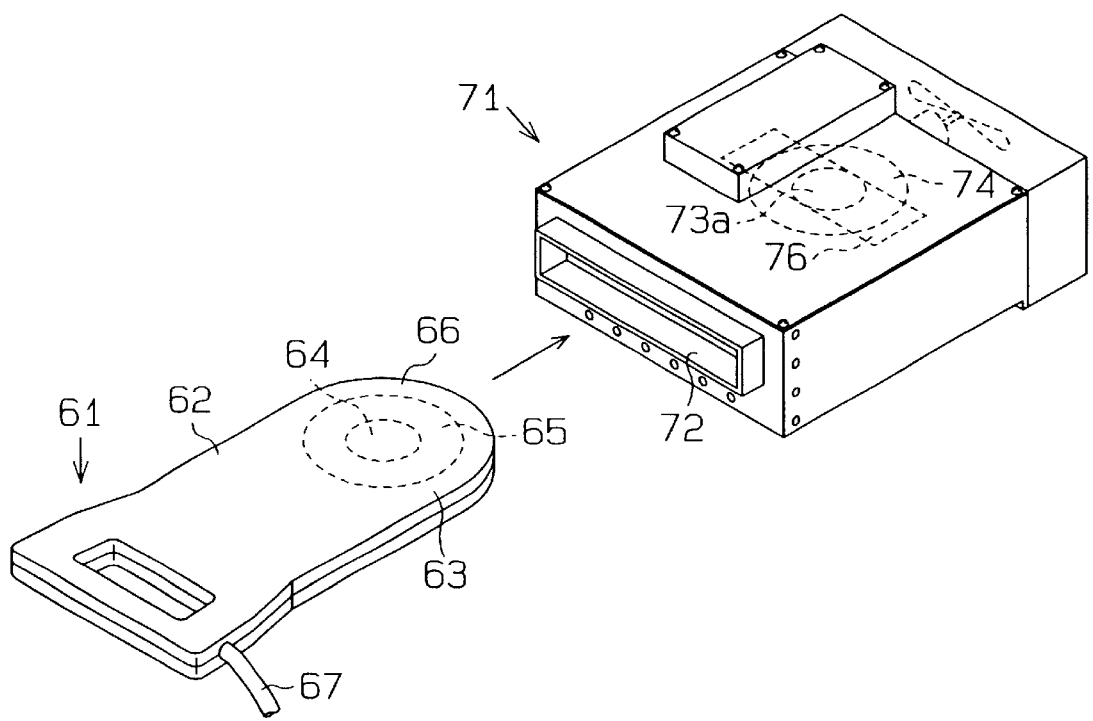
FIG. 6 is a perspective view illustrating a conventional charging paddle and charging receptacle.
Figure 7:
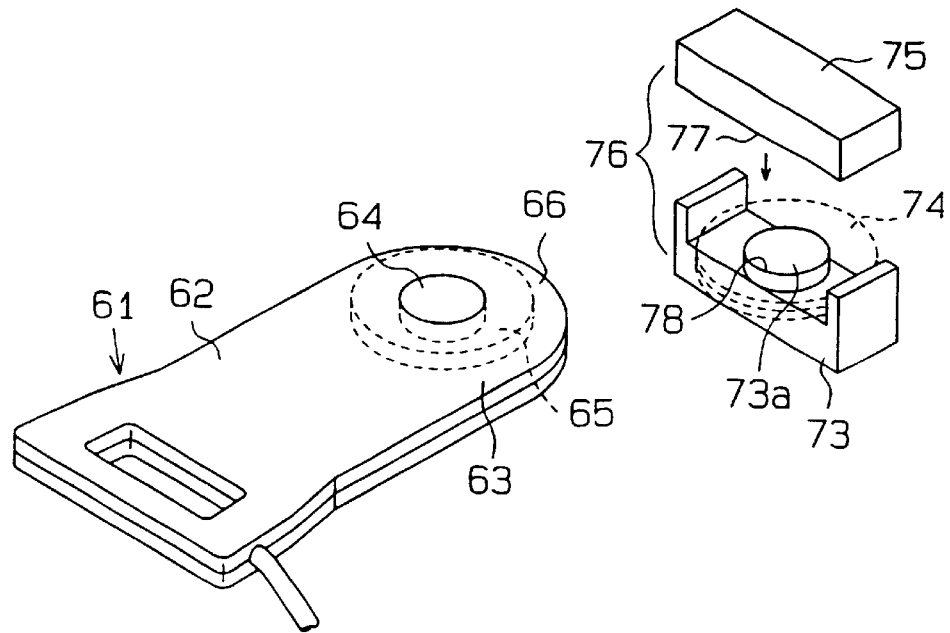
FIG. 7 is a perspective view of a primary core of the charging paddle and a secondary core of the charging receptacle in FIG. 6.
Figure 8:
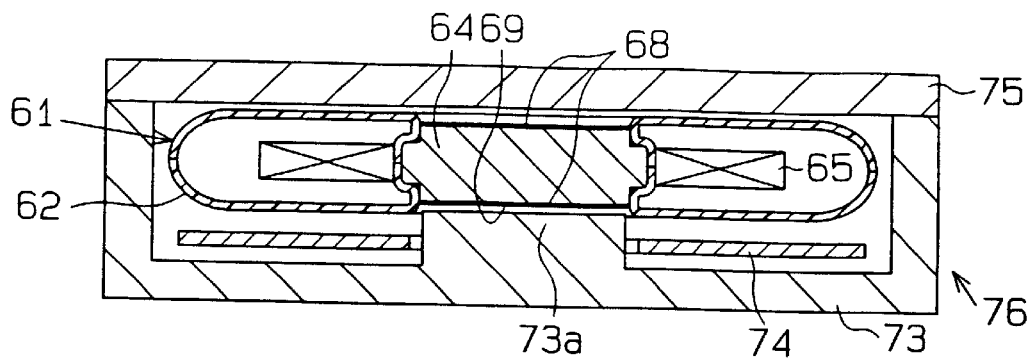
FIG. 8 is a cross-sectional view of the charging paddle in FIG. 6.
Figure 9:
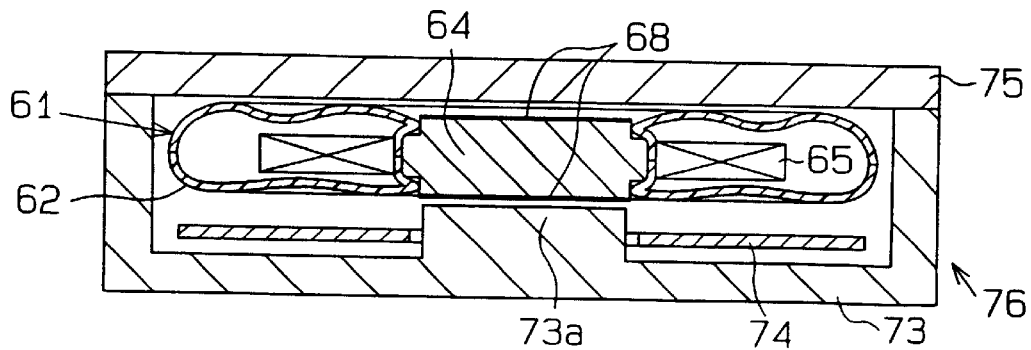
FIG. 9 is a cross-sectional view of the charging paddle in FIG. 6.

The outer annular protrusions 26 may surround a portion of the primary core 6 instead of surrounding the entire primary core 6. For example, as shown in FIG. 5, the outer annular protrusions 26 may extend outward from the outer surfaces 4a on two opposite sides of the primary core 6.

The coating layer 28 may be replaced with another coating that mitigates heat.

The paddle case 20 may be formed by bonding techniques other than the vibration welding, if the accuracy of the bonding for the shells 21 and a required period of time are not taken into consideration.

The primary coil 7 may be formed by a wound litz wire instead of a thin flat plate.

Therefore, the present examples and embodiments are to be considered as illustrative and not restrictive and the invention is not to be limited to the details given herein, but may be modified within the scope and equivalence of the appended claims.

What is claimed is:

1. A charging paddle for an electromagnetic induction type connection terminal for connecting a power supply station to a battery for charging the battery, wherein the connection terminal includes a charging paddle, which includes a primary coil that is connected to the power supply station, and a charging receptacle, which includes a secondary coil that is connected to the battery, wherein the charging receptacle receives the charging paddle, and a current supplied from the power supply station to the primary coil causes a current to flow between the secondary coil and the battery, the charging paddle comprising:
   a paddle case having a surface, the surface includes an opening;
   a core about which the primary coil is wound, the core being held within the paddle case such that a surface of the core faces outside through the opening; and
   a protrusion extending from the surface of the case, wherein the protrusion extends outward from the surface of the core.

2. The charging paddle according to claim 1, wherein the opening is circular, and the protrusion is formed about the opening.

3. The charging paddle according to claim 2, wherein the protrusion is annular and is formed around the entire periphery of the opening.

4. The charging paddle according to claim 2, wherein the protrusion is located on two opposite sides of the opening.

5. The charging paddle according to claim 1, wherein the surface of the core that faces the outside through the opening are each coated with a resin.

6. The charging paddle according to claim 5, wherein the resin is a fluoropolymer.

7. A charging paddle for an electromagnetic induction type connection terminal for connecting a power supply station to a battery for charging the battery, wherein the connection terminal includes a charging paddle, which includes a primary coil that is connected to the power supply station, and a charging receptacle, which includes a secondary coil that is connected to the battery, wherein the charging receptacle receives the charging paddle, and a current supplied from the power supply station to the primary coil causes a current to flow between the secondary coil and the battery, the charging paddle comprising:
   a paddle case, the paddle case having a pair of shells, each of which including a surface having an opening;
   a core about which the primary coil is wound, the core being held within the paddle case such that surfaces of the core face outside through the opening; and
   a protrusion extending from the surface of each shell, wherein the protrusion extends outward from the surface of the core.

8. The charging paddle according to claim 7, wherein the opening is circular, and the protrusion is formed about the opening.

9. The charging paddle according to claim 8, wherein the protrusion is annular and is formed around the entire periphery of the opening.

10. The charging paddle according to claim 8, wherein the protrusion is located on two opposite sides of the opening.

11. The charging paddle according to claim 7, wherein the surfaces of the core that face the outside through the opening are each coated with a resin.

12. The charging paddle according to claim 11, wherein the resin is a fluoropolymer.

13. A method of manufacturing a charging paddle, the charging paddle comprising:
   a paddle case including a pair of shells, each of which including a surface having an opening, each shell having a peripheral edge portion that extends inward, each edge portion having an end face;
   a core about which a primary coil is wound, the core having surfaces that face the outside through the opening; and
   a protrusion extending from the surface of each shell, the protrusion having an end face,
   wherein the method comprises:
   putting the pair of shells one upon the other such that the end faces of the edge portions of the shells contact each other; and
   vibration welding the shells together to form the paddle case, wherein the core is held by the shells such that surfaces of the core face the outside through the opening, and wherein each protrusion extends outward beyond the corresponding outwardly facing surface of the core.

14. The method according to claim 13, further comprising stopping the vibration welding when the distance between the end faces of the protrusions is equal to a predetermined distance, which is larger than the distance between the outwardly facing surfaces of the core.

* * * * *

UNITED STATES PATENT AND TRADEMARK OFFICE
CERTIFICATE OF CORRECTION

PATENT NO. : 6,291,969 B1 Page 1 of 1
DATED : September 18, 2001
INVENTOR(S) : Masaaki Kaneko It is certified that error appears in the above-identified patent and that said Letters Patent is hereby corrected as shown below:

Column 4,
Line 61, please add -- 1 -- after FIG.

Signed and Sealed this

Seventh Day of May 2002

*Attest:*

*Attesting Officer*

JAMES E. ROGAN
*Director of the United States Patent and Trademark Office*